UNITED STATES PATENT OFFICE.

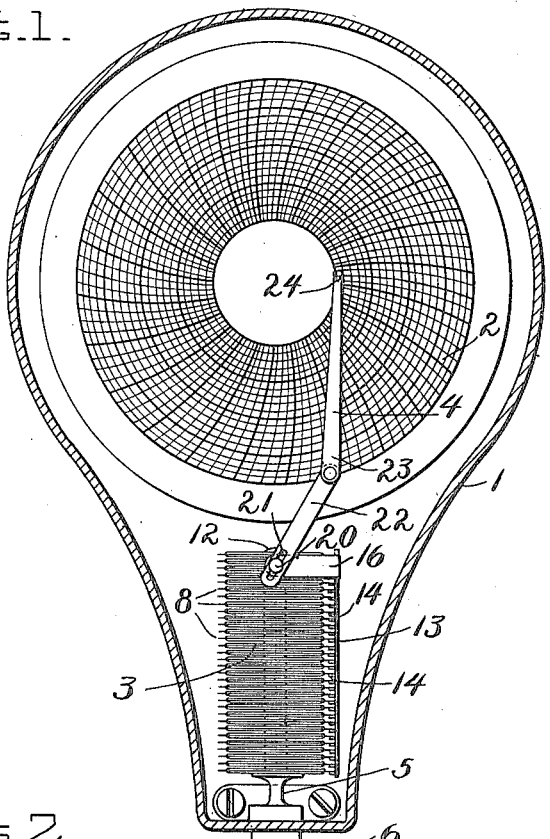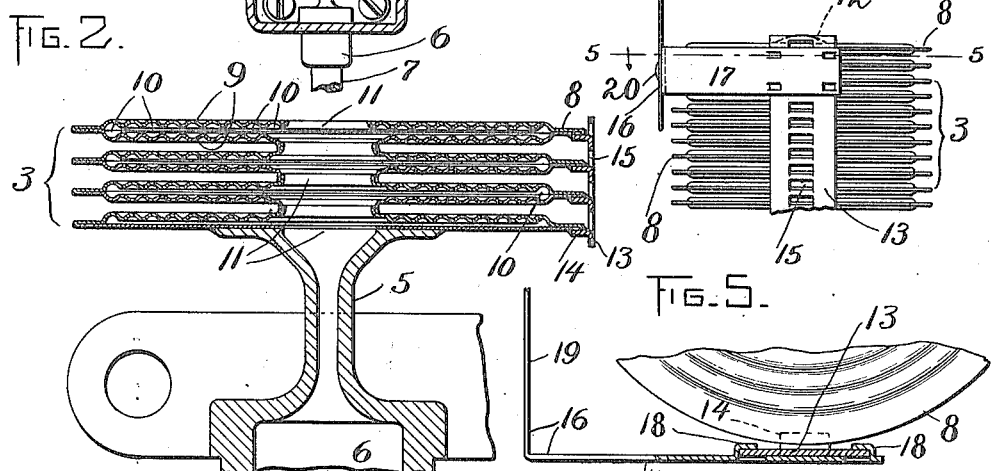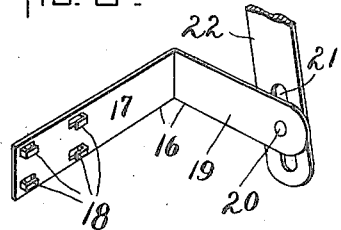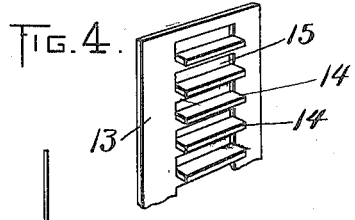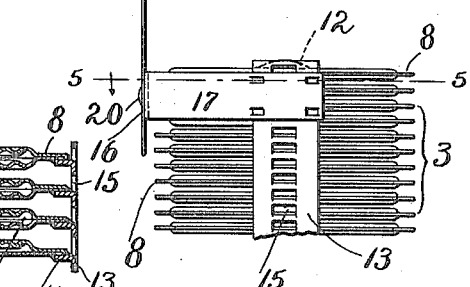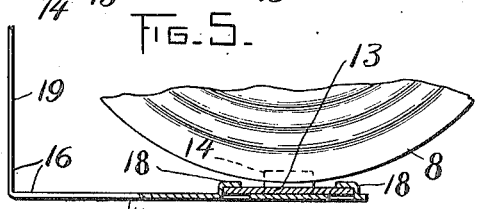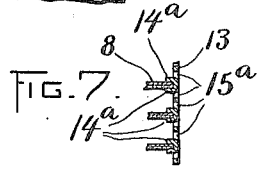

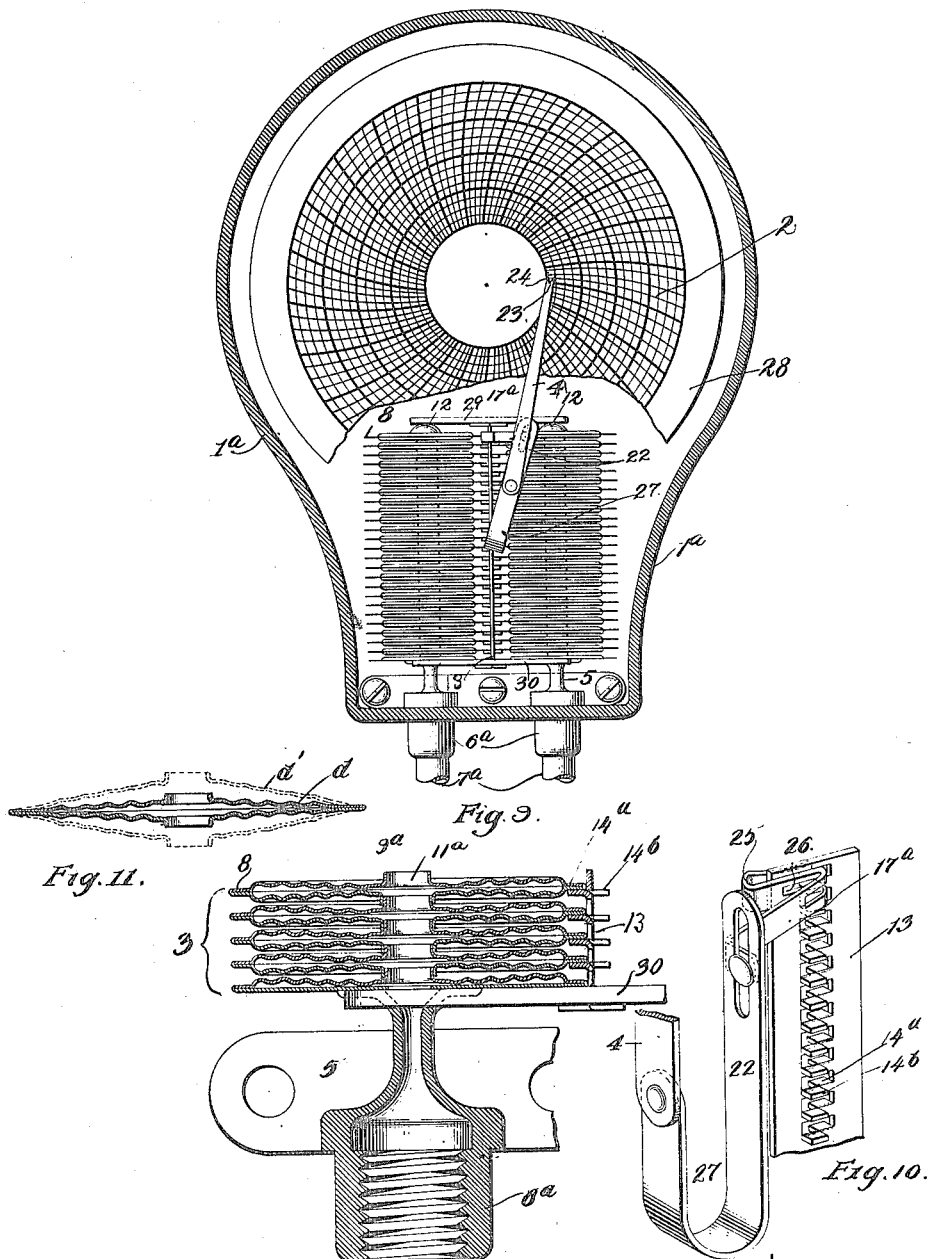

BENNET B. BRISTOL, OF NAUGATUCK, CONNECTICUT, ASSIGNOR, BY MESNE ASSIGNMENTS, TO THE FOXBORO COMPANY, OF FOXBORO, MASSACHUSETTS, A CORPORATION OF MASSACHUSETTS.

RECORDING PRESSURE-GAGE.

1,161,376.  Specification of Letters Patent.  Patented Nov. 23, 1915.

Application filed April 11, 1906. Serial No. 311,067.

*To all whom it may concern:*

Be it known that I, BENNET B. BRISTOL, a citizen of the United States, residing at Naugatuck, in the county of New Haven, State of Connecticut, have invented an Improvement in Recording Pressure-Gages, of which the following description, in connection with the accompanying drawings, is a specification, like numerals on the drawings representing like parts.

My invention relates to instruments for indicating or recording pressures and variations thereof.

A prior patent granted to W. H. Bristol No. 420,570, dated Feb. 4, 1890 shows an instrument, comprising a tube made up of a series of expansible sections or diaphragms and adapted to be elongated or contracted by increase or diminution of internal pressure, the tendency to change of length being restrained by one or more flexible strips secured either within or without the tube to the inner or outer peripheral edges of the said diaphragm, said restraining strip or strips acting to prevent the elongation of that side of the tube to which it is secured while permitting free elongation of its opposite side, thereby to produce a resulting deflection of the free end of the tube which is utilized to indicate the amount of pressure. In instruments of this type, as at present constructed, reference being made to said patent for a more detailed description than is given here, each restraining strip is composed of a flat band of metal secured to the tube by solder, necessarily applied on its inner or tube side. The presence of the solder has been found to impair the efficient action or resiliency of the strip and tube, so that while easily deflected, a return to normal position is not readily obtained, because of a permanent deflection or "set" produced by said solder. One feature of my invention resides in the provision of means to overcome this objection, whereby a sensitive instrument is secured that will indicate and record all variations of pressure without appreciable error. This and other features of my invention, however, will be best understood and appreciated from the following description, when taken in connection with the accompanying drawings of an instrument embodying one form of my invention, its scope being more particularly pointed out in the appended claims.

Referring to the drawings,—Figure 1 is a front elevation of a complete instrument selected for purposes of illustration; Fig. 2, an enlarged sectional detail of the lower end of the expansion tube to show the manner of securing the flexible strip thereto; Fig. 3, an enlarged elevation of the right side of the expansion tube to show the flexible strip and the adjustable connection of the inking pointer thereto; Fig. 4, an enlarged detail of a portion of the flexible strip; Fig. 5, an enlarged plan and partial section of the top of the tube on line 5—5 (Fig. 3), with parts broken away; Fig. 6, a detail view of the lower sections of the inking pointer; Fig. 7, a modified form of the flexible strip; Fig. 8, a vertical section of a modified form of tube; Fig. 9, a similar view to Fig. 1, showing my invention applied to a differential pressure recorder; Fig. 10, a detail of the restraining strip and the form of pointer used therewith; and Fig. 11, a sectional detail of a usual type of expansible section of which pressure tube is composed.

In the embodiment of my invention illustrated, the instrument is provided with a suitable case, 1, within which is mounted the pressure recording mechanism comprising a chart 2, rotated by the usual clockwork (not shown), the pressure expansion tube 3, and its inking pointer or pen arm 4.

The bottom of the tube 3 is provided with a head 5, (Fig. 2) secured and supported in a vertical position within said case, said head having an opening therethrough and a nipple 6 communicating therewith and receiving the pipe 7, (Fig. 1) which is connected to any fluid containing receptacle, the pressure of which is to be indicated or recorded.

The expansion tube comprises, in the present instance, (see Fig. 2) a plurality of independent sections 8, each formed of two flat rings or diaphragms 9, having concentric corrugations. These diaphragms are suitably united at their edges to form a series of expansion chambers 10, communicating and forming a continuous tube by openings 11, in their centers. A tube of desired length being built up in this way the opening in the upper diaphragm is closed by a cap or button 12, the lower diaphragm being secured to said head 5, with its opening 11, communicating with said nipple 6 and the pipe 7. As thus constructed, the tube as a whole tends to elongate or contract when subjected to variations between the internal and external pressure, an increase or decrease in the internal pressure while the external pressure remains constant respectively causing an expansion or contraction of the sections of the tube and a consequent tendency to elongate or contract the tube. Similarly under constant internal pressure, increase or decrease of external pressure tends to produce respective contraction or elongation of the tube. This tendency to elongate or contract, however, is prevented at one side of the tube by suitable restraining means, so that the tube is deflected to one or the other side proportionate to the variations between said pressures. For restraining the tube to produce such deflections; any suitable number of restraining strips may be employed which are suitably connected to and at one side of the tube, but one, however, being provided in the present embodiment of my invention. As herein shown a flexible strip 13, preferably of the same metal as that of which the tube is composed or of a metal having approximately the same coefficient of expansion under varying temperatures, is secured along one edge of the tube and an important feature of my invention resides in the improved form and manner in which said flexible strip 13, is secured to the expansion tube, so that while said strip restrains the elongation of one side of the tube as its internal pressure increases, thereby causing a deflection of said tube and strip, there shall so far as possible be no solder or other material on the flexing surfaces of said strip to impair the resiliency of the strip and thereby prevent its return to the vertical or normal position under normal pressure, thereby overcoming the objectionable "setting" or permanent deflection caused by the use of solder for securing the diaphragm sections to the body of the strip and which has interfered with the resilient action thereof. In the embodiment illustrated said means comprises a series of out-turned lips or ears 14 (Figs. 2 and 5) died out or struck up from the strip itself and preferably along its medial longitudinal portion and bent at an angle thereto, the number of lips and the space or interval between them respectively corresponding to the number of diaphragm sections in the tube and the interval between them, so that said lips and sections may readily be connected together by any suitable means, as solder, said lips in the present instance constituting the attaching elements or members by means of which the strip is secured to and along one side of the tube. In securing said strip 13 to the tube it is placed along one edge thereof, with each of said ears 14, resting against the peripheral or circumferential edge of an adjacent section or diaphragm to which it is secured by suitable means. Preferably when in such position, solder is dropped through each of said slots upon the engaging portions or the adjacent and opposing edges of said ears 14 and diaphragms 9 to unite them together.

In the modification shown by Fig. 7 two opposing lips or ears 14ᵃ are provided adjacent the edges of each of the slots 15ᵃ, which are formed by inturning said ears 14ᵃ in opposite directions, said lips receiving between them the edge of a diaphragm in which position it is secured by soldering, as has been described. By thus arranging a plurality of continuous strip portions at the opposite side of each series of attaching ears, a more perfect balance and action is obtained than would be the case if a single strip only were used at one side of such series of attaching ears, but my invention of course is not limited in this respect.

By forming the strip with lips or ears 14 or 14ᵃ, and slots 15 or 15ᵃ, greater durability and resiliency are secured than is possible with a lighter solid strip and by the use of attaching ears no foreign metal need be applied to the resilient and flexing portion on either side of or along the flexing surfaces or sides of the strip to impair or interfere with its resiliency or affect its elasticity, so that its responsiveness is not limited, and when deflected it will always return to normal position under normal pressure, said structural means preventing any tendency to a "set" in said strip and tube.

In instruments of this kind, any variations between the external pressure and that within the tube or other responsive member causes a contraction or expansion of the several sections and consequently of said tube in the direction of its length. This tendency being restrained at one side of the tube by the strip the unrestrained tendency at the opposite side of the tube causes the upper or free end of the tube to be deflected toward or from the restrained side of the tube for utilizing this movement to measure the pressure to which said deflection is due, an inking pointer or pen arm 4 is provided, adapted not only to indicate but to record the amount thereof.

Hitherto the inking pointer or pen arm has been secured or attached to the free end of the tube and usually to the upper diaphragm section, but I have found it more desirable and advantageous to adjustably attach it to the restraining strip itself thereby permitting a finer adjustment of said pointer relative to said strip and also to the chart 2, over and upon the face of which it is adapted to move.

In the present instance, the inking pointer comprises a plurality of sections adjustably secured together, the lower one 16, being also adjustably secured to the restraining strip 13. This lower section 16, is bent into right angular form, one of its arms 17 (Figs. 3, 5 and 6) having clips 18 formed or secured at its lower end, spaced to engage or embrace the sides of the said flexible strip 13, and permit said arm 17, to be slid longitudinally thereon to adjust it in any desired position. The other arm 19, of this angular section 16, is in this instance arranged across the front of the tube and is provided with a headed stud or pin 20 at its outer end, which is slidably secured in a longitudinal slot 21 in the end of the intermediate pointer section 22, the head of said stud engaging the sides of said slot and permitting said intermediate section 22 to be longitudinally or angularly adjusted relative to said arm section 16 or the strip 13. The stud and slot are arranged to form a friction joint so that the sections 16 and 22 are firmly held and may be secured in adjusted position.

The upper end of the intermediate section is pivotally connected to the pen section 23 of the pointer, which enables it to be swung into any desired position laterally. Of these three adjustable connections, one permits longitudinal motion only to increase or diminish the length of the pointer, and one angular adjustment; the intermediate one permitting both adjustments, and all together enabling the inking portion 24 of the pointer to be placed in any desired position upon the chart or dial 2.

As hitherto constructed each of the expansible sections of the pressure tube have tapered from their centers to the periphery so that the inner surfaces of the disks $d$ against which the pressure of the contained fluid acts, have been inclined to the diametral plane of said section, as illustrated in Fig. 11. In operation these disks are separated by pressure and assume the position shown in dotted lines $d'$, requiring more pressure for further separation than when in normal position, and producing unequal deflections of the tube for equal differences of pressure obviously resulting in the use of a variable scale instead of a uniform one. To remedy this defect, the expansible section diaphragms 9 (Figs. 1, 2 and 3) are arranged parallel to the medial diametral plane of the section or are dished as illustrated in Fig. 8, the diaphragms 9ª being closer together adjacent their communicating opening or channel 11ª than at their outer portions. Referring to Figs. 2 and 8, it will be noted that the outer peripheral portions of the diaphragms are bent inward vertically and then horizontally, the horizontal edge portion of each forming a convenient surface to engage that of the opposed diaphragm, said surfaces being suitably secured together by any suitable means as by solder. The vertically turned or bent portions together form a wall by which the diaphragm surfaces are separated or held apart, each of the diaphragms preferably forming an angle therewith of not more than 90°, the separation of the diaphragms adjacent to said wall being equal to the maximum separation between them. This arrangement presents the inner surfaces of the diaphragms at a more desirable angle and to effect a more uniform separation thereof for equal variations of pressure and consequently a more uniform movement thereof and of the connected indicating or recording arm 4. By constructing the sections in this manner the pointer swings over the entire range of the scale or chart 2, uniformly in either direction and permits the use of a uniform scale or chart, the deflections of the tube and consequently of the pointer carried thereby corresponding to the same variation of pressure throughout the range of pressure to which the tube is subjected.

In the embodiment of my invention illustrated in Fig. 9, two pressure tubes or other responsive members are employed each of which communicates by its nipple 6ª and pipe 7ª with a different pressure receptacle, the tubes being secured to the oppositely bent attaching ears 14ª, 14ᵇ of a restraining strip 13 in the same manner as in the form shown by Figs. 1–3.

The attaching end of the pointer or pen arm however is obviously of a different construction (see Fig. 10) the arm 17ª having a reversely bent end constituting a spring clip 25, having a slot 26 in its end to permit it being placed astride one of the attaching ears 14ᵇ.

The pointer or pen arm is preferably bent back upon itself to provide a loop or elbow 27, to embrace the chart 2 and dial 28 and permit the top of the tube to be placed behind the bottom of said chart 2 and dial 28, thus enabling a shorter casing 1ª to be used than in the type illustrated in Fig. 1.

By using the form of diaphragm sections illustrated in Figs. 2 and 8 far more efficient results are secured than is possible by the use of the type illustrated in Fig. 11, and which are commonly employed, for if each tube is subjected to pressures, approximately, for example, 100 lbs., and one exceeds the other by a 5 lbs. and deflects the tubes and pointer or ink arm over the chart it is evident that this movement does not correspond and is not equal to that made when the pressures approximate 25 lbs. and differ by the same amount. This is evident since a greater pressure is required to produce a given deflection when the diaphragms are in the position indicated by reference letter $d'$ than when in the position $d$ corresponding to lower pressures. For this reason the flat or dished form of sections (Figs. 2 and 8) should be used in differential gages.

The differential gage Fig. 9 is also provided with what may be denominated truss frames 29, 30, rigidly and respectively connecting the top and bottom sections of the two tubes with the upper and lower ends of the restraining strip 13, the head 5 supporting the tubes only at their bases and thus permitting their upper ends or heads to be deflected together to one or the other side and proportionate to the excess or variation of pressure. By comparing this gage with that shown in Fig. 1 it is apparent that in the latter the sections 8 are only restrained at the points where they are connected with the restraining strip 13, and as the pressure within the tube is increased the opposite or left edge of the sections will separate more than their inner edges and before any deflection is effected. This construction therefore causes the instrument to be less sensitive and accurate than it ought to be and it is to overcome this defect that the trusses are used; their action being to prevent longitudinal separation of the sections except as permitted by the resulting deflection of the strip.

The differential gage (Fig. 9) operates as follows: The pressure receptacles being in communication with their respective pressure tubes 8, through the pipes 7ª, it will be apparent that while the pressure within one remains equal to that within the other, the tendency of each tube to deflect is offset by that of the other. This is due to the fact that the restraining strip is arranged between them; so that their normal tendencies to deflect are in opposite directions and balance one another. When, however, the pressure in one tube varies from that of the other and as the tubes are united at their heads by the truss frame 29, the relatively greater expansion of one tube due to its excess of pressure acts directly upon said frame and by the restraint imposed by the strip 13 produces a deflection of the two tubes together and proportional to such excess. This arrangement produces a very sensitive, compact, and reliable instrument with a uniform scale and which is entirely free from irregularity in action or tendency to set.

The chart 2, makes one revolution, say, every twenty four hours, and is graduated with radial arcs and concentric circles, the divisions thereof respectively corresponding to pressures and hours of the day. The pen 24 carries suitable inking material and traces a line upon the chart corresponding to the varying pressure within the tube 6, pipe 7, and vessel to which the latter is connected, said line being continuous and constituting a complete record of the pressure and its fluctuations for the twenty-four hours or day. The chart, however, may be rotated at any other rate that is desired.

The instrument herein described and illustrated is adapted for use wherever pressures are to be indicated or recorded; it being equally immaterial whether it be used with steam, gas, air, or other fluid, and whether used to record pressures above that of the atmosphere or for vacuums. It is also equally adapted to record change in external pressure by maintaining the internal pressure constant whatever be its amount.

It will be understood that my invention is not limited to the specific embodiment herein selected for illustration purposes only, nor to its details and arrangement of parts but that the same may be modified within wide limits without departing from the spirit and scope thereof.

Claims:

1. A pressure indicator comprising an expansion tube having a series of diaphragm sections, a restraining strip therefor provided with a plurality of attaching members extending laterally from the body of said strip for connection with a plurality of said sections.

2. A pressure indicator comprising an expansion tube provided with a series of diaphragm sections and a restraining strip therefor having its sides devoid of foreign matter such as solder, said strip being provided with a plurality of laterally extending members connected adjacent their outer ends with a plurality of said sections.

3. A pressure indicator having an expansion tube composed of a plurality of expansible sections and a restraining strip arranged along one side of said tube and provided with a series of lips or ears, extending laterally from said strip, a plurality of which are connected with a plurality of said sections, to prevent elongation of said side upon a change of the external or internal pressure to which said tube is normally subjected and acting to produce a deflection of said tube, and an indicating or recording arm movable therewith and deflected by movements thereof.

4. A pressure indicator comprising an expansion tube having a series of expansible sections and a restraining strip having a plurality of attaching elements bent transversely for connections with a plurality of said sections.

5. A pressure indicator comprising an expansion tube having a series of expansible sections, a restraining strip having one or more straight sides, and an adjoining portion thereof provided with inturned ears integral with said strip and bent transversely thereto, a plurality of said ears being connected with a plurality of said sections.

6. In a pressure indicator, an expansion tube provided with a series of diaphragm sections, and a restraining strip therefor having a series of inturned ears cut out of said strip along a lineal portion thereof, a plurality of said ears being secured each to an adjacent diaphragm section.

7. A pressure indicator comprising an expansion tube provided with a pointer, a restraining strip having a series of ears arranged longitudinally along a medial portion thereof and extending transversely therefrom, a plurality of said ears being secured to one side of said tube and acting to cause a deflection thereof and of said pointer upon a change of external or internal pressure, one of which is normally constant.

8. A pressure indicator comprising an expansion tube and a restraining strip, longitudinally arranged on one side thereof, having a series of lateral projections, a plurality thereof being secured to said tube, and an adjustable pointer provided with means for adjustably connecting it with said strip.

9. A pressure indicator comprising an expansion tube and a restraining strip, longitudinally arranged on one side thereof, having a series of lateral projections, a plurality thereof being secured to said tube, and a pointer having means for varying its length, adjusting it laterally, and for adjustably connecting it with said strip.

10. In a pressure indicator, an expansion tube, a restraining strip therefor, and a pointer having a slidable connection with said strip to permit its adjustment thereon and relative thereto.

11. In a pressure indicator, an expansion tube, a restraining strip therefor, and a pointer having means for embracing said strip to permit adjustment relative thereto.

12. In a pressure indicator, an expansion tube, a restraining strip therefor, and a pointer having means comprising clips for slidably securing it on said strip to permit said pointer being adjusted longitudinally thereon.

13. A pressure indicator comprising an expansion tube provided with a series of diaphragm sections, a restraining strip therefor having a plurality of attaching elements transversely arranged relative thereto for connection with a plurality of said sections, a marking pointer connected with the free end of said tube, in combination with a chart, over which said marking pointer is arranged to move to record the pressure.

14. A pressure indicator comprising an expansion tube having a series of expansible sections, a restraining strip having attaching elements arranged transversely relative to the length of said strip and forming exterior to the linear surfaces of said strip connections with a plurality of said sections, a marking pointer connected with the free end of said tube, in combination with a chart, over which said marking pointer is arranged to move to record the pressure.

15. In a differential pressure indicator, a plurality of pressure tubes each comprising expansible sections, a restraining strip provided with ears extending in opposite directions relative to said strip and connected with the edges of the sections of said tubes and acting to produce a deflection of said tubes as they are subjected to unequal pressures.

16. In a pressure indicator, the pressure tube 3 comprising expansible sections 8 and a restraining strip 13 provided with integral lips for connection with a plurality of said sections.

17. In a device of the type described, a pressure tube provided with a series of expansible diaphragm sections, a restraining device arranged at one side of said tube and connected with a plurality of said diaphragm sections, and auxiliary truss connections uniting the end portions of said device with the adjacent ends of the tube, normally preventing separation of the peripheral portions of said sections at the side of said tube opposite to that upon which said device is connected and coöperating therewith to produce simultaneous deflection of said tube and said device.

18. In a pressure indicator the pressure tube 3 comprising expansible sections 8, and a restraining strip 13 provided with integral lips for connection with a plurality of said sections, and a pointer 4 connected with and movable with said tube.

19. A differential pressure gage comprising a pair of pressure tubes each composed of a plurality of expansible diaphragm sections and a restraining strip intermediate the tubes and connected therewith.

20. In an instrument of the character described, the combination of a pointer device; responsive means to govern the pointer device; a support for the pointer device intermediate the responsive means and the pointer device; and means for holding the pointer device fixed with relation to the support during the operation of the instrument while permitting relative adjustment of the two both lengthwise and transversely of the pointer device, said means including a slotted connecting element between the pointer device and its support.

21. In an instrument of the class described, the combination of a plurality of responsive members placed side by side each composed of a plurality of expansible diaphragm sections whose axes are spaced apart and substantially parallelly arranged; a flexible restraining member common to and attached to the marginal portions of said sections of the responsive members; and a device governed by conjoint response of said members.

22. In an instrument of the class described, the combination of rigidly connected separate opposed responsive members having separate sources of control and having conjoint responsive movement in a curvilinear path; and a device governed by conjoint operation of said responsive members.

23. In an instrument of the class described, a plurality of separate responsive members having homologous ends stationary and their opposite ends rigidly connected; and having capacity for conjoint responsive movement in a direction transverse to their common median line, and a governed device operated by conjoint response of said members In testimony whereof, I have signed my name to this specification, in the presence of two subscribing witnesses

BENNET B. BRISTOL.

Witnesses:
W. E. GOODYEAR,
E. H. BRISTOL.